(12) United States Patent
Ishida et al.

(10) Patent No.: US 8,524,416 B2
(45) Date of Patent: Sep. 3, 2013

(54) ELECTROLYTE ELECTRODE ASSEMBLY AND FUEL CELL

(75) Inventors: Kentaro Ishida, Shioya-gun (JP); Hiroyuki Tanaka, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 628 days.

(21) Appl. No.: 12/469,342

(22) Filed: May 20, 2009

(65) Prior Publication Data

US 2009/0291350 A1  Nov. 26, 2009

(30) Foreign Application Priority Data

May 22, 2008 (JP) ................................. 2008-133800

(51) Int. Cl.
*H01M 8/02* (2006.01)

(52) U.S. Cl.
USPC ......................................... 429/508; 429/514

(58) Field of Classification Search
USPC ........................................................ 429/518
See application file for complete search history.

(56) References Cited

U.S. PATENT DOCUMENTS

| 6,017,648 | A | * | 1/2000 | Jones | 429/434 |
| 8,129,066 | B2 | | 3/2012 | Ozaki et al. | |
| 2005/0014059 | A1 | * | 1/2005 | Kaye | 429/38 |
| 2007/0275288 | A1 | * | 11/2007 | Goebel et al. | 429/38 |

FOREIGN PATENT DOCUMENTS

| JP | 5-242897 | 9/1993 |
| JP | 10-172587 | 6/1998 |
| JP | 2004-522285 | 7/2004 |
| JP | 2006-228580 | 8/2006 |
| JP | 2009-37854 | 2/2009 |
| WO | 03/007403 A1 | 1/2003 |
| WO | 2007/043423 A1 | 4/2007 |

OTHER PUBLICATIONS

Japanese Office Action for Application No. 2008-133800, 4 pages, dated Mar. 12, 2013.

* cited by examiner

*Primary Examiner* — Maria J Laios
(74) *Attorney, Agent, or Firm* — Nelson Mullins Riley & Scarborough LLP; Anthony A. Laurentano

(57) ABSTRACT

A unit cell of a fuel cell is formed by sandwiching a membrane electrode assembly between a first metal separator and a second metal separator. The membrane electrode assembly includes a solid polymer electrolyte membrane having a reinforcement member on both surfaces of the outer end of the solid polymer electrolyte membrane. Frame members are provided on the reinforcement member outside an anode, and a fuel gas inlet channel and a fuel gas outlet channel are formed by the frame members, at positions corresponding to a fuel gas inlet buffer and a fuel gas outlet buffer.

8 Claims, 16 Drawing Sheets

ELECTROLYTE ELECTRODE ASSEMBLY AND FUEL CELL

BACKGROUND OF THE INVENTION

1. Field of the Invention

The present invention relates to an electrolyte electrode assembly including a pair of electrodes and an electrolyte interposed between the electrodes. Further, the present invention relates to a fuel cell including the electrolyte electrode assembly, and a pair of separators sandwiching the electrolyte electrode assembly.

2. Description of the Related Art

For example, a solid polymer electrolyte fuel cell employs a solid polymer electrolyte membrane (electrolyte). The solid polymer electrolyte membrane is a polymer ion exchange membrane. In the fuel cell, an anode and a cathode each including an electrode catalyst layer and a porous carbon are provided on both sides of the solid polymer electrolyte membrane to form a membrane electrode assembly (electrolyte electrode assembly). The membrane electrode assembly is sandwiched between separators (bipolar plates) to form a unit cell. In use, normally a predetermined number of unit cells are stacked together to form a fuel cell stack, and the fuel cell stack is mounted in a vehicle, for example.

In general, in the membrane electrode assembly, the surface area of the solid polymer electrolyte membrane is larger than the surface areas of the anode and the cathode, and the outer end of the solid polymer electrolyte membrane protrude outwardly from the anode and the cathode. However, the mechanical strength of the solid polymer electrolyte membrane is low, and the outer end can be damaged easily.

In this regard, a solid polymer electrolyte fuel cell as disclosed in Japanese Laid-Open Patent Publication No. 05-242897 is known. As shown in FIG. 16, the fuel cell includes a membrane electrode assembly 3 including a solid polymer electrolyte membrane 1 and an anode 2a and a cathode 2b provided on both main surfaces of the solid polymer electrolyte membrane 1. The membrane electrode assembly 3 is sandwiched between reactant gas supply plates 4a, 4b.

The reactant gas supply plate 4a has a fuel gas flow field 5a for supplying a fuel gas to the anode 2a, and the reactant gas supply plate 4b has an oxygen-containing gas flow field 5b for supplying an oxygen-containing gas to the cathode 2b.

Gas seals 6a, 6b are provided between the membrane electrode assembly 3 and the reactant gas supply plates 4a, 4b. Reinforcement membranes 7a, 7b are provided between the gas seals 6a, 6b and the solid polymer electrolyte membrane 1.

In the case of forming a fuel cell stack by stacking a plurality of the fuel cells, reactant gas passages (not shown) extending in the stacking direction are formed in the outer ends of the reactant gas supply plates 4a, 4b. Further, the reactant gas passages for the fuel gas are connected to the fuel gas flow field 5a to supply the fuel gas to the fuel gas flow field 5a and the reactant gas passages for the oxygen-containing gas are connected to the oxygen-containing gas flow field 5b to supply the oxygen-containing gas to the oxygen-containing gas flow field 5b. The fuel cell stack adopts so called internal manifold structure.

In the structure, buffers needs to be provided between the reactant gas passages for the fuel gas and the fuel gas flow field 5a, and between the reactant gas passages for the oxygen-containing gas and the oxygen-containing gas flow field 5b for smoothly distributing the fuel gas and the oxygen-containing gas to the power generation surfaces.

However, in the fuel cell, the gas seals 6a, 6b are provided around the solid polymer electrolyte membrane 1 such that the reinforcement membranes 7a, 7b are interposed between the solid polymer electrolyte membrane 1 and the gas seals. Therefore, the cross sectional areas in the flow fields of the buffers become considerably small. Thus, the pressure losses due to concentration of the reactant gases become large, and it is not possible to supply the sufficient amount of the reactant gases to the power generation surfaces.

SUMMARY OF THE INVENTION

The present invention has been made to solve the problem described above, and an object of the present invention is to provide an electrolyte electrode assembly and a fuel cell including the electrolyte electrode assembly in which, with compact structure, the electrolyte is reinforced, and sufficient reactant gases are distributed to the power generation surfaces.

The present invention relates to an electrolyte electrode assembly for a fuel cell. The electrolyte electrode assembly includes a pair of electrodes and an electrolyte interposed between the electrodes. The surface area of the electrolyte is larger than the surface areas of the electrodes. A frame reinforcement member is provided at least on one surface of an outer end of the electrolyte electrode assembly protruding outwardly from the electrodes.

The frame reinforcement member has a reactant gas channel for flowing a fuel gas or an oxygen-containing gas as a reactant gas.

Further, the present invention relates to a fuel cell formed by sandwiching an electrolyte electrode assembly between a pair of separators. The electrolyte electrode assembly includes a pair of electrodes and an electrolyte interposed between the electrodes. The surface area of the electrolyte is larger than the surface areas of the electrodes. A frame reinforcement member is provided on at least on one surface of an outer end of the electrolyte electrode assembly protruding outwardly from the electrodes.

A reactant gas flow field for supplying a fuel gas or an oxygen-containing gas as a reactant gas along one of the electrodes and a buffer for allowing at least the reactant gas to flow between the outside of the one of the electrodes and the reactant flow field are provided between the electrolyte electrode assembly and one of the separators. The frame reinforcement member has a reactant gas channel for flowing the reactant gas, at a position corresponding to the buffer.

In the electrolyte electrode assembly of the present invention, since the frame reinforcement member is provided at least on one surface of the outer end of the electrolyte, the electrolyte is reinforced suitably. Further, since the reactant gas channel is formed in the frame reinforcement member, the desired channel height of the reactant gas channel is achieved without requiring any increase in the thickness of the electrolyte electrode assembly itself.

Therefore, the overall size of the fuel cell is reduced, and the pressure loss in the reactant gas channel is lowered. The product water is discharged smoothly. Further, it becomes possible to distribute the reactant gas uniformly to the electrode. Improvement in the power generation performance is achieved easily.

Further, in the fuel cell of the present invention, the reinforcement member has the reactant gas channel for flowing the reactant gas, at a position corresponding to the buffer. Thus, it is possible to achieve the sufficient cross sectional area in the buffer where the reactant gas flowing along the electrode surface is concentrated. It becomes possible to smoothly and reliably distribute the reactant gas from the buffer to the reactant gas flow field or from the reactant gas flow field to the buffer.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
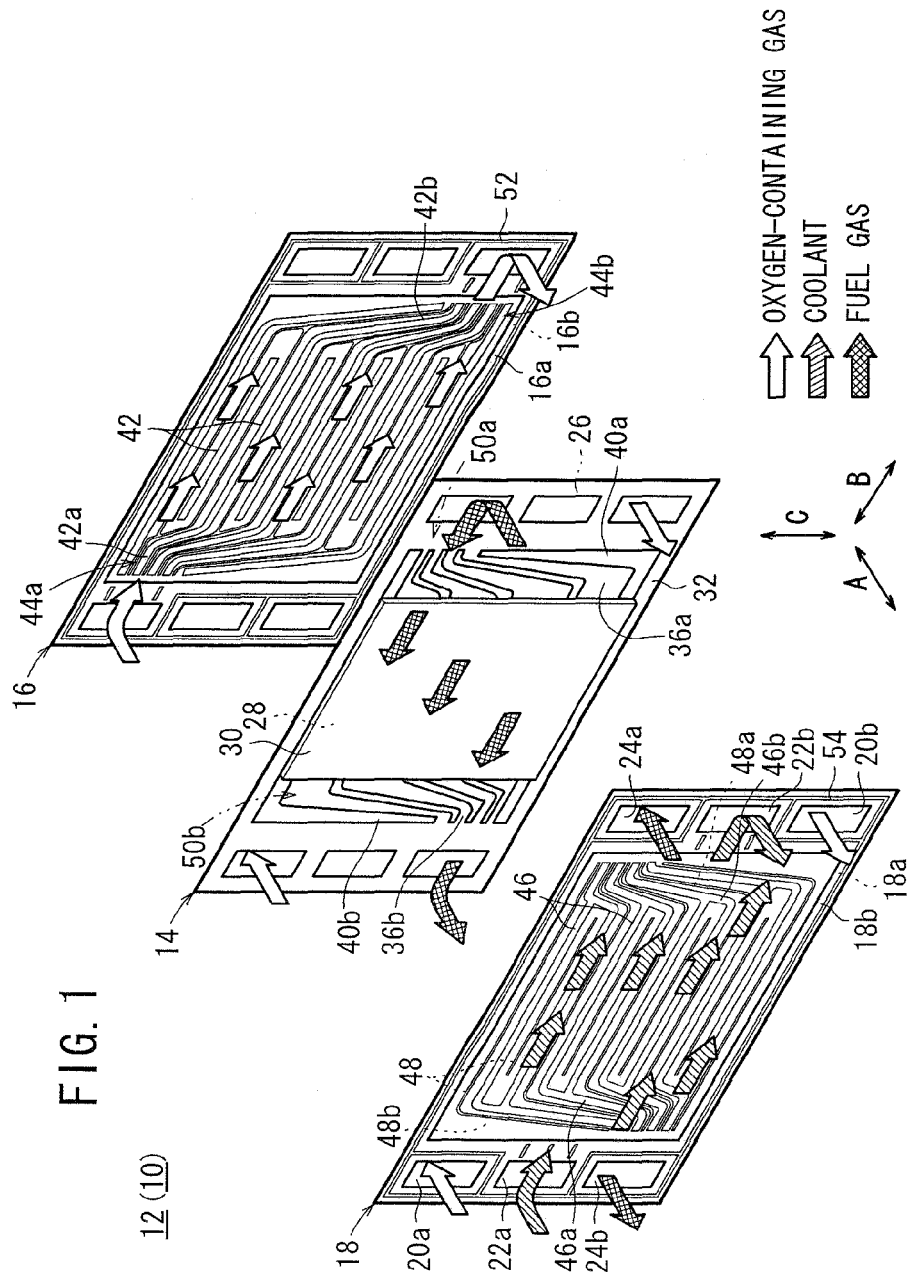
FIG. 1 is an exploded perspective view schematically showing a fuel cell according to a first embodiment of the present invention.
Figure 2:
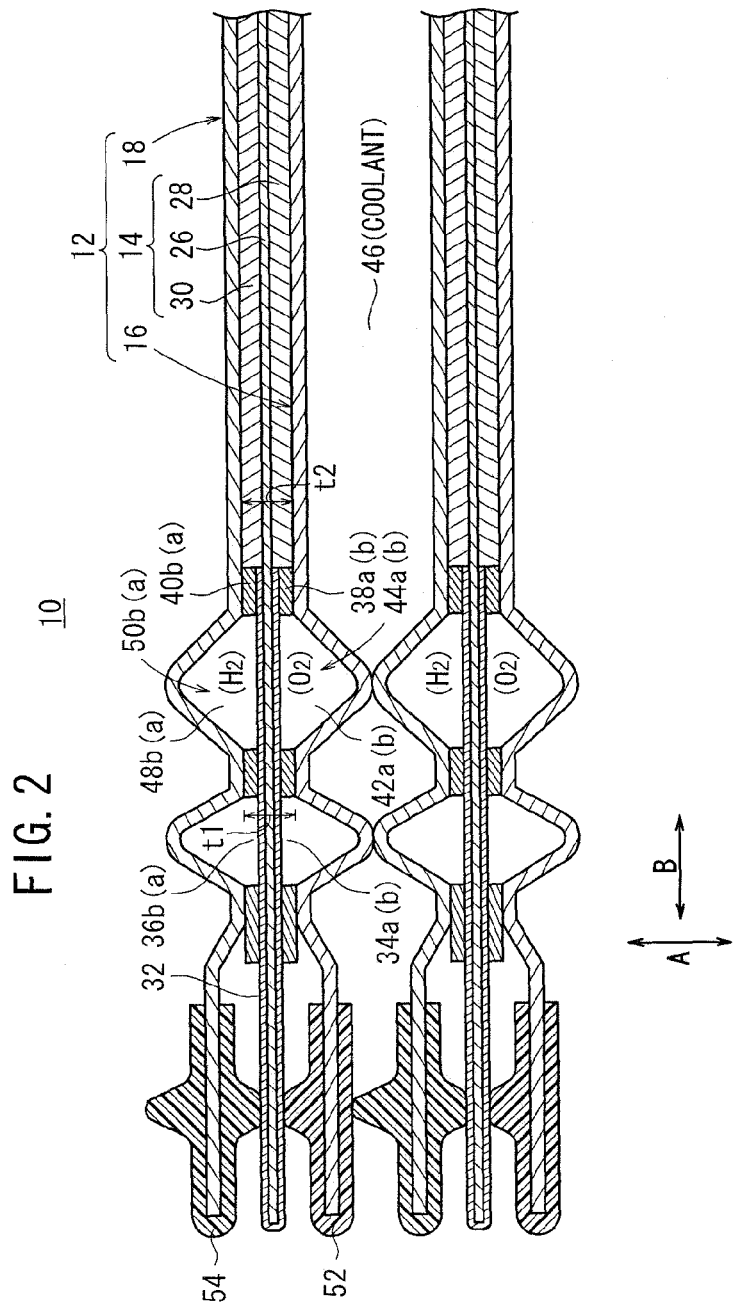
FIG. 2 is a cross sectional view showing the fuel cell formed by stacking a plurality of unit cells.

As shown in FIGS. 1 and 2, a fuel cell 10 according to a first embodiment of the present invention has stack structure formed by stacking a plurality of unit cells 12 in a direction indicated by an arrow A.

Each of the unit cells 12 includes a membrane electrode assembly (electrolyte electrode assembly) 14 and a first metal separator 16 and a second metal separator 18 sandwiching the membrane electrode assembly 14. For example, the first metal separator 16 and the second metal separator 18 are formed by pressure forming using steel plates, stainless steel plates, aluminum plates, plated steel sheets, or metal plates having anti-corrosive surfaces by surface treatment.

At one end of the unit cell 12 in a horizontal direction indicated by an arrow B in FIG. 1, an oxygen-containing gas supply passage 20a for supplying an oxygen-containing gas and a coolant supply passage 22a for supplying a coolant, and a fuel gas discharge passage 24b for discharging a fuel gas such as a hydrogen-containing gas are arranged in a vertical direction indicated by an arrow C. The oxygen-containing gas supply passage 20a, the coolant supply passage 22a, and the fuel gas discharge passage 24b extend through the unit cell 12 in the direction indicated by the arrow A.

At the other end of the unit cell 12 in the direction indicated by the arrow B, a fuel gas supply passage 24a for supplying the fuel gas, a coolant discharge passage 22b for discharging the coolant, and an oxygen-containing gas discharge passage 20b for discharging the oxygen-containing gas are arranged in the direction indicated by the arrow C. The fuel gas supply passage 24a, the coolant discharge passage 22b, and the oxygen-containing gas discharge passage 20b extend through the unit cell 12 in the direction indicated by the arrow A.

For example, the membrane electrode assembly 14 includes a cathode 28, an anode 30, and a solid polymer electrolyte membrane 26 interposed between the cathode 28 and the anode 30. The solid polymer electrolyte membrane 26 is formed by impregnating a thin membrane of perfluorosulfonic acid with water, for example. The surface area of the solid polymer electrolyte membrane 26 is larger than the surface areas of the cathode 28 and the anode 30.

Each of the cathode 28 and the anode 30 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 30 and the electrode catalyst layer of the cathode 28 are fixed to both surfaces of the solid polymer electrolyte membrane 26, respectively.

A resin frame reinforcement member 32 (reinforcement membrane) is formed integrally with both surfaces of the outer end of the solid polymer electrolyte membrane 26, e.g., by injection molding. Alternatively, a resin sheet is formed integrally with both surfaces of the outer end of the solid polymer electrolyte membrane 26 using adhesive. As the resin material, in addition to general-purpose plastic, for example, engineering plastic or super engineering plastic (e.g., PI, PPS) is used. The reinforcement member 32 is thinner than the cathode 28 and the anode 30 (see FIG. 2). The reinforcement member 32 may be provided only on one surface of the solid polymer electrolyte membrane 26.

Figure 3:
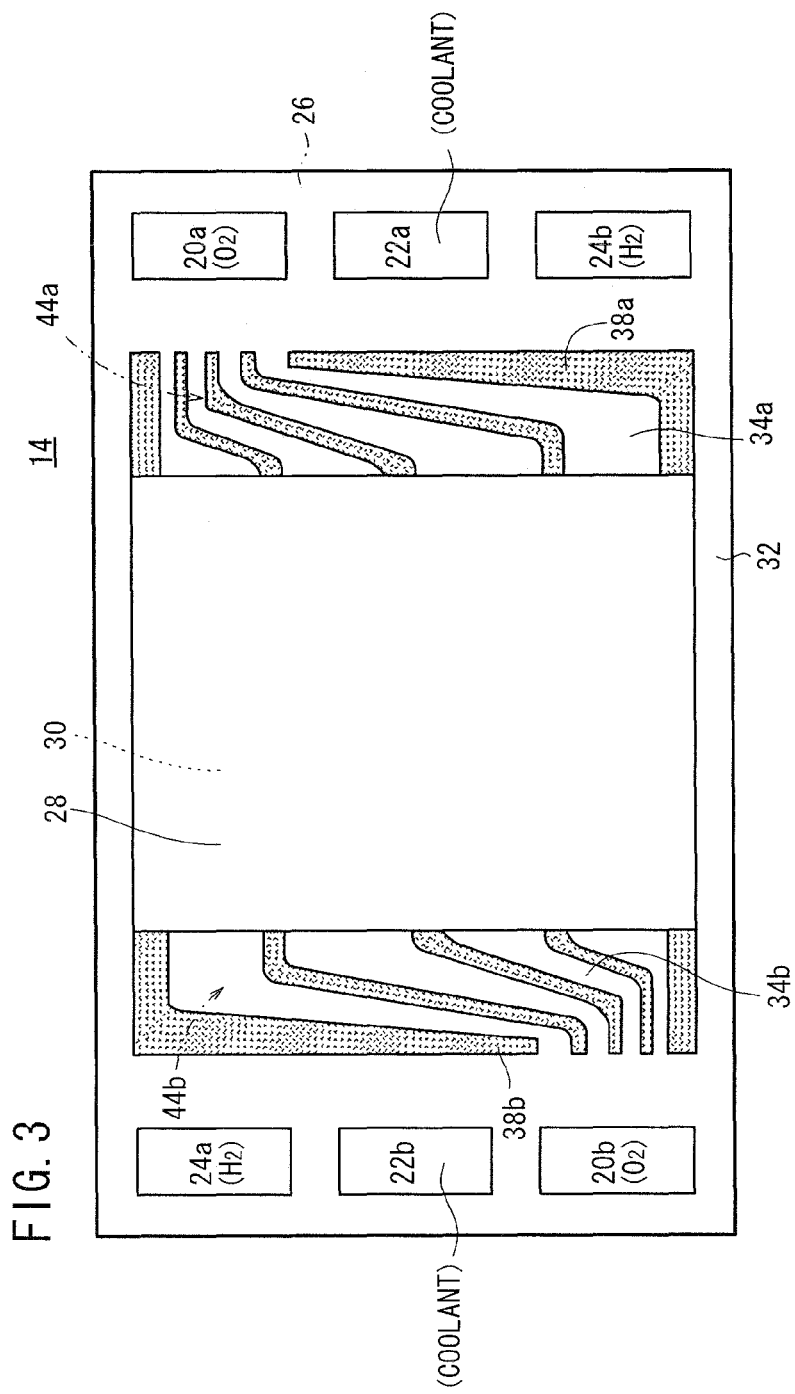
FIG. 3 is a front view showing an electrolyte electrode assembly of the unit cell.

As shown in FIGS. 2 and 3, on a surface of the reinforcement member 32 facing the first metal separator 16, an oxygen-containing gas inlet channel 34a for flowing the oxygen-containing gas is formed at a position corresponding to an oxygen-containing gas inlet buffer 44a as described later, and an oxygen-containing gas outlet channel 34b for flowing the oxygen-containing gas is formed at a position corresponding to an oxygen-containing gas outlet buffer 44b as described later.

As shown in FIGS. 1 and 2, on a surface of the reinforcement member 32 facing the second metal separator 18, a fuel gas inlet channel 36a for flowing the fuel gas is formed at a position corresponding to a fuel gas inlet buffer 50a as described later and a fuel gas outlet channel 36b for flowing the fuel gas is formed at a position corresponding to a fuel gas outlet buffer 50b as described later.

The oxygen-containing gas inlet channel 34a and the oxygen-containing gas outlet channel 34b are formed by frame members 38a, 38b each having a desired channel shape. The frame members 38a, 38b are joined to the reinforcement member 32. For example, the frame members 38a, 38a are made of the same material as the reinforcement member 32. Adhesive is applied to the frame members 38a, 38b beforehand, and the frame members 38a, 38b are fixed to the reinforcement member 32 thermally under pressure.

Likewise, the fuel gas inlet channel 36a and the fuel gas outlet channel 36b are formed by frame members 40a, 40b each having a desired channel shape. The frame members 40a, 40b are joined to the reinforcement member 32. The frame members 40a, 40b are made of the same material as the reinforcement member 32. Adhesive is applied to the frame members 40a, 40b beforehand, and the frame members 40a, 40b are fixed to the reinforcement member 32 thermally under pressure. The thickness t1 between the frame members 38a, 40b (frame members 38b, 40a) is the same as the thickness t2 of the membrane electrode assembly 14 (t1=t2). In the structure, the membrane electrode assembly 14 can be handled easily, and pressure forming of the first metal separator 16 and the second metal separator 18 can be performed easily.

The first metal separator 16 has a plurality of oxygen-containing gas flow grooves 42 on its surface 16a facing the membrane electrode assembly 14. The oxygen-containing gas flow grooves 42 are formed by corrugating the first metal separator 16 to have ridges and grooves. The oxygen-containing gas flow grooves 42 extend in parallel to each other in the direction indicated by the arrow B along the power generation surface of the cathode 28. An oxygen-containing gas inlet flow field 42a and an oxygen-containing gas outlet flow field 42b are connected to both ends of the oxygen-containing gas flow grooves 42.

An oxygen-containing gas inlet buffer 44a is formed by the oxygen-containing gas inlet channel 34a and the oxygen-containing gas inlet flow field 42a, and an oxygen-containing gas outlet buffer 44b is formed by the oxygen-containing gas outlet channel 34b and the oxygen-containing gas outlet flow field 42b.

The oxygen-containing gas from the oxygen-containing gas supply passage 20a is supplied through the oxygen-containing gas inlet buffer 44a to the oxygen-containing gas flow grooves 42 in the power generation surface, and the oxygen-containing gas after partially consumed is discharged from the oxygen-containing gas flow grooves 42 through the oxygen-containing gas outlet buffer 44b to the oxygen-containing gas discharge passage 20b.

Figure 4:
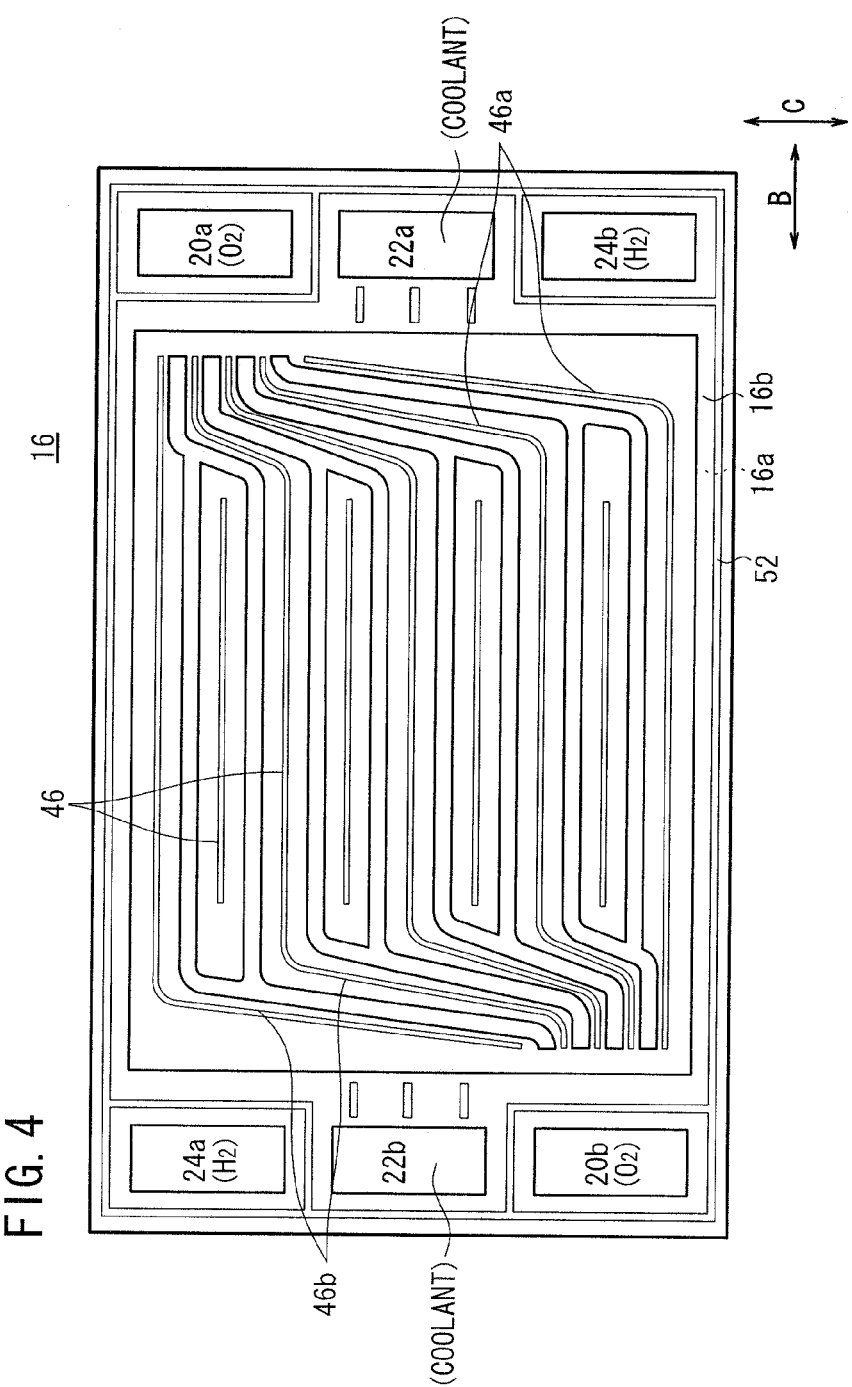
FIG. 4 is a front view showing a first metal separator of the unit cell.

As shown in FIG. 4, a plurality of coolant flow grooves 46 are formed on a surface 16b of the first metal separator 16, i.e., formed by the back surface of the oxygen-containing gas flow grooves 42. A coolant inlet flow field 46a is formed by the back surface of the oxygen-containing gas inlet flow field 42a, and a coolant outlet flow field 46b is formed by the back surface of the oxygen-containing gas outlet flow field 42b. The coolant inlet flow field 46a and the coolant outlet flow field 46b are connected to both ends of the coolant flow grooves 46.

Figure 5:
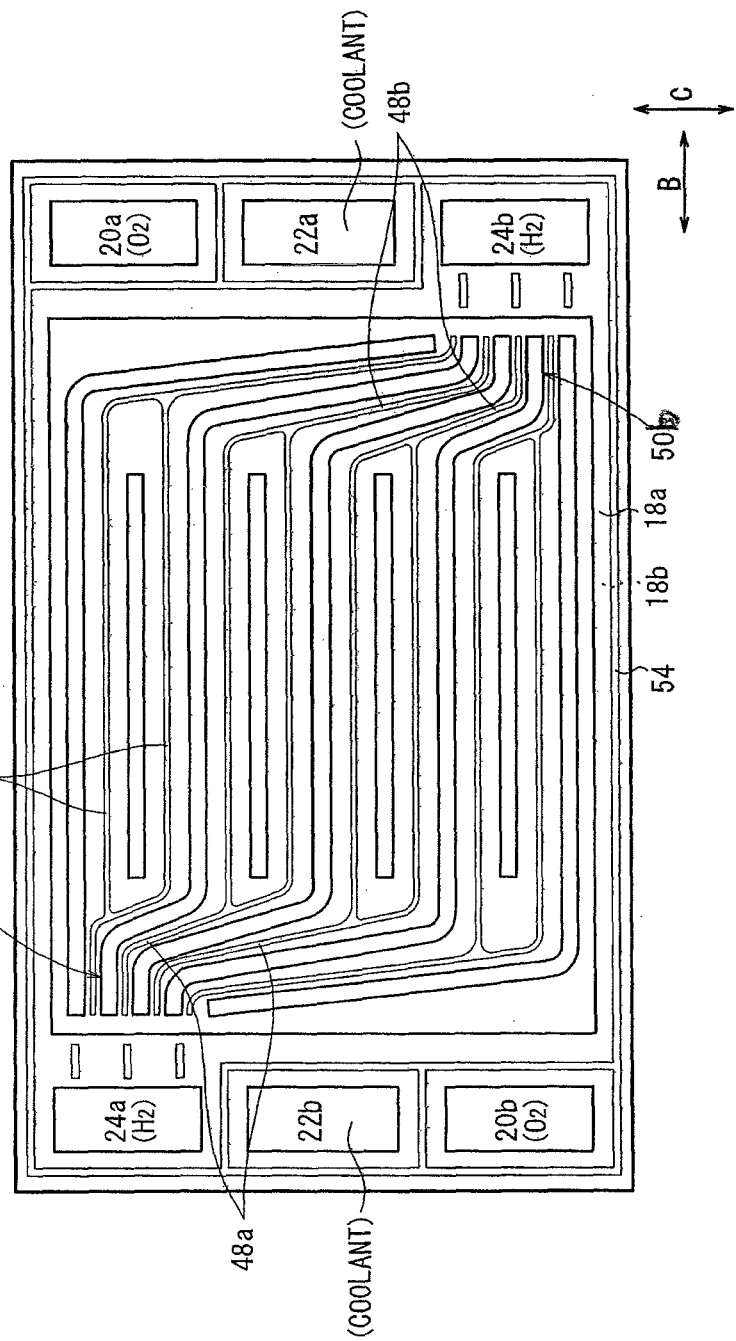
FIG. 5 is a front view showing a second metal separator of the unit cell.

As shown in FIG. 5, the second metal separator 18 has a plurality of fuel gas flow grooves 48 on its surface 18a facing the membrane electrode assembly 14. The fuel gas flow grooves 48 are formed by corrugating the second metal separator 18 to have ridges and grooves. The fuel gas flow grooves 48 extend in parallel along the power generation surface of the anode 30 in the direction indicated by the arrow B. A fuel gas inlet flow field 48a and a fuel gas outlet flow field 48b are connected to both ends of the fuel gas flow grooves 48.

A fuel gas inlet buffer 50a and a fuel gas outlet buffer 50b are formed between the membrane electrode assembly 14 and the second metal separator 18. The fuel gas from the fuel gas supply passage 24a is supplied through the fuel gas inlet buffer 50a to the fuel gas flow grooves 48 in the power generation surface, and the fuel gas after partially consumed is discharged from the fuel gas flow grooves 48 through fuel gas outlet buffer 50b to the fuel gas discharge passage 24b.

The fuel gas inlet buffer 50a is formed by the fuel gas inlet channel 36a and the fuel gas inlet flow field 48a, and the fuel gas outlet buffer 50b is formed by the fuel gas outlet channel 36b and the fuel gas outlet flow field 48b.

As shown in FIG. 1, a plurality of coolant flow grooves 46 is formed on the surface 18b of the second metal separator 18, i.e., formed by the back surface of the fuel gas flow grooves 48. The coolant inlet flow field 46a formed by the back surface of the fuel gas outlet flow field 48b and the coolant outlet flow field 46b formed by the back surface of the fuel gas inlet flow field 48a are connected to both ends of the coolant flow grooves 46.

As shown in FIGS. 1, 2, and 4, a first seal member 52 is provided in the outer ends of the surfaces 16a, 16b of the first metal separator 16. As shown in FIGS. 1, 2, and 5, a second seal member 54 is provided in the outer ends of the surfaces 18a, 18b of the second metal separator 18.

Next, operation of the fuel cell 10 will be described below.

Firstly, as shown in FIG. 1, an oxygen-containing gas is supplied to the oxygen-containing gas supply passage 20a, and a fuel gas such as a hydrogen-containing gas is supplied to the fuel gas supply passage 24a. Further, a coolant such as pure water, ethylene glycol, or oil is supplied to the coolant supply passage 22a.

Thus, the oxygen-containing gas flows from the oxygen-containing gas supply passage 20a to the oxygen-containing gas flow grooves 42 through the oxygen-containing gas inlet buffer 44a of the first metal separator 16. The oxygen-containing gas flows in the direction indicated by the arrow B along the oxygen-containing gas flow grooves 42, and the oxygen-containing gas is supplied to the cathode 28 of the membrane electrode assembly 14 for inducing an electrochemical reaction at the cathode 28.

As shown in FIG. 5, the fuel gas flows from the fuel gas supply passage 24a to the fuel gas flow groove 48 through the fuel gas inlet buffer 50a of the second metal separator 18. The fuel gas flows in the direction indicated by the arrow B along the fuel gas flow grooves 48, and the fuel gas is supplied to the anode 30 of the membrane electrode assembly 14 for inducing an electrochemical reaction at the anode 30.

Thus, in each of the membrane electrode assemblies 14, the oxygen-containing gas supplied to the cathode 28, and the fuel gas supplied to the anode 30 are partially consumed in the electrochemical reactions at catalyst layers of the cathode 28 and the anode 30 for generating electricity.

The oxygen-containing gas after partially consumed is discharged to the oxygen-containing gas discharge passage 20b through the oxygen-containing gas outlet buffer 44b. The fuel gas after partially consumed is discharged to the fuel gas discharge passage 24b through the fuel gas outlet buffer 50b.

The coolant is supplied from the coolant supply passage 22a to the coolant flow grooves 46 formed between the first metal separator 16 and the second metal separator 18. After the coolant cools the power generation surfaces of the membrane electrode assembly 14, the coolant is discharged to the coolant discharge passage 22b.

In the first embodiment, in the membrane electrode assembly 14, the reinforcement member 32 is provided on both surfaces of the outer end of the solid polymer electrolyte membrane 26 extending outwardly from the cathode 28 and the anode 30 to suitably reinforce the solid polymer electrolyte membrane 26.

As shown in FIGS. 2 and 3, the reinforcement member 32 has the oxygen-containing gas inlet channel 34a and the oxygen-containing gas outlet channel 34b formed by the frame members 38a, 38b on the surface facing the first metal separator 16. Thus, the thickness of the membrane electrode assembly 14 does not become large, and the desired channel height (groove depth) is achieved in the oxygen-containing gas inlet channel 34a and the oxygen-containing gas outlet channel 34b.

The oxygen-containing gas inlet flow field 42a having the same shape as the oxygen-containing gas inlet channel 34a and the oxygen-containing gas outlet flow field 42b having the same shape as the oxygen-containing gas outlet channel 34b are formed in the first metal separator 16.

In the structure, the oxygen-containing gas inlet buffer 44a formed by the oxygen-containing gas inlet channel 34a and the oxygen-containing gas inlet flow field 42a and the oxygen-containing gas outlet buffer 44b formed by the oxygen-containing gas outlet channel 34b and the oxygen-containing gas outlet flow field 42b can have the sufficient flow field heights (channel heights), respectively. Thus, the size of the unit cell 12 in the stacking direction does not become large, and the overall size of the fuel cell 10 is reduced advantageously. The pressure losses in the oxygen-containing gas inlet buffer 44a and the oxygen-containing gas outlet buffer 44b are lowered effectively.

Further, the product water is discharged smoothly from the oxygen-containing gas inlet buffer 44a and the oxygen-containing gas outlet buffer 44b, and the oxygen-containing gas is distributed uniformly to the cathode 28. Improvement in the power generation performance is achieved easily.

Likewise, the frame members 40a, 40b are fixed to the reinforcement member 32 to form the fuel gas inlet channel 36a and the fuel gas outlet channel 36b (see FIGS. 1 and 2). Further, the second metal separator 18 has the fuel gas inlet flow field 48a facing the fuel gas inlet channel 36a, and the fuel gas outlet flow field 48b facing the fuel gas outlet channel 36b to form the fuel gas inlet buffer 50a and the fuel gas outlet buffer 50b, respectively.

In the structure, the fuel gas inlet buffer 50a and the fuel gas outlet buffer 50b have the desired flow field heights, respectively, and the thickness of the unit cell 12 does not become large. Thus, the overall size of the fuel cell 10 is reduced. The fuel gas is distributed uniformly to the anode 30, and improvement in the power generation performance is achieved.

In the first embodiment, the oxygen-containing gas inlet channel 34a and the oxygen-containing gas inlet flow field 42a have substantially the same shape. However, the oxygen-containing gas inlet channel 34a and the oxygen-containing gas inlet flow field 42a may have different shapes. Likewise, the oxygen-containing gas outlet channel 34b and the oxygen-containing gas outlet flow field 42b may have different shapes, the fuel gas inlet channel 36a and the fuel gas inlet flow field 48a may have different shapes, and the fuel gas outlet channel 36b and the fuel gas outlet flow field 48b may have different shapes.

Figure 6:
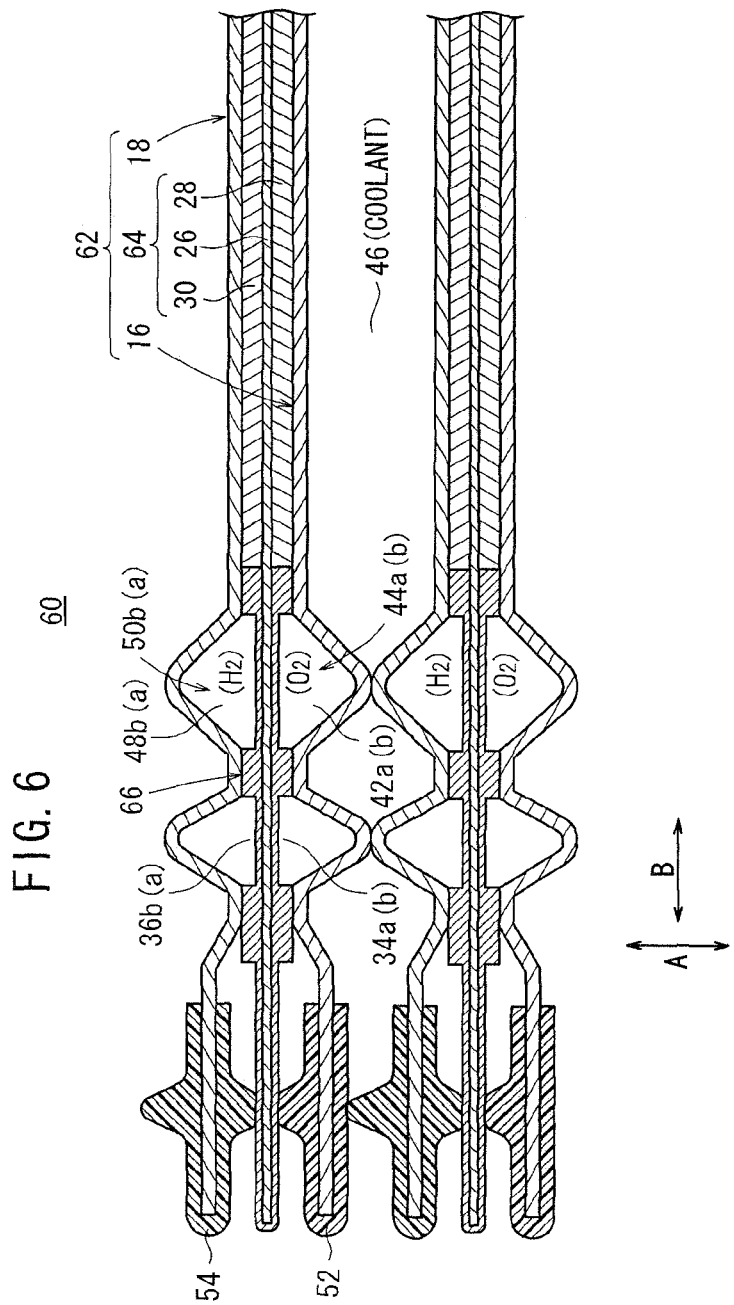
FIG. 6 is a cross sectional view showing a fuel cell according to a second embodiment of the present invention.

FIG. 6 is a cross sectional view showing a fuel cell 60 according to a second embodiment. The constituent elements that are identical to those of the fuel cell 10 according to the first embodiment are labeled with the same reference numeral, and description thereof will be omitted. Further, also in third to fifth embodiments as descried later, the constituent elements that are identical to those of the fuel cell 10 according to the first embodiment are labeled with the same reference numeral, and description thereof will be omitted.

The fuel cell 60 is formed by stacking a plurality of unit cells 62, and each of the unit cells 62 includes a membrane electrode assembly 64 according to a second embodiment. A resin frame reinforcement member 66 is formed integrally with both surfaces of the outer end of the solid polymer electrolyte membrane 26 of the membrane electrode assembly 64.

A surface of the reinforcement member 66 facing the first metal separator 16 is cut away to form the oxygen-containing gas inlet channel 34a and the oxygen-containing gas outlet channel 34b. Further, a surface of the reinforcement member 66 facing the second metal separator 18 is cut away to form the fuel gas inlet channel 36a and the fuel gas outlet channel 36b.

In the second embodiment, the reinforcement member 66 is provided on both surfaces of the outer end of the solid polymer electrolyte membrane 26. Further, the oxygen-containing gas inlet channel 34a, the oxygen-containing gas outlet channel 34b, the fuel gas inlet channel 36a, and the fuel gas outlet channel 36b are formed in the reinforcement member 66 itself. Thus, the same advantages as in the case of the first embodiment are achieved. For example, the thickness of the membrane electrode assembly 64 does not become large, the desired channel height is achieved, and the product water is discharged smoothly.

Figure 7:
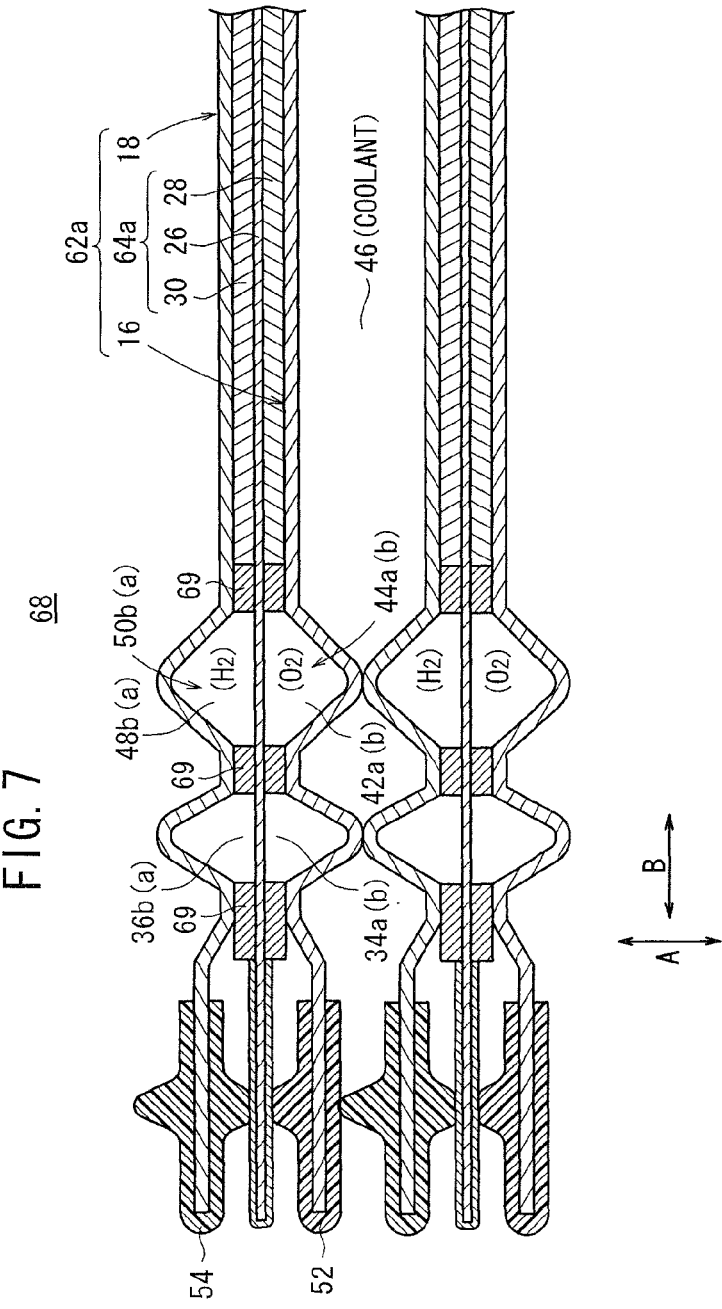
FIG. 7 is a cross sectional view showing a fuel cell according to a third embodiment of the present invention.

FIG. 7 is a cross sectional view showing a fuel cell 68 according to a third embodiment of the present invention.

The fuel cell 68 is formed by stacking a plurality of unit cells 62a, and each of the unit cells 62a includes a membrane electrode assembly 64a according to a third embodiment. A plurality of resin frame reinforcement members 69 are formed integrally with both surfaces of the outer end of the solid polymer electrolyte membrane 26 of the membrane electrode assembly 64a.

The reinforcement members 69 are provided at positions where the first metal separator 16 and the second metal separator 18 are close to each other. The solid polymer electrolyte membrane 26 is exposed to the oxygen-containing gas inlet buffer 44a, the oxygen-containing gas outlet buffer 44b, the fuel gas inlet buffer 50a, and the fuel gas outlet buffer 50b between the reinforcement members 69.

In the third embodiment, the same advantages as in the cases of the first and second embodiments are obtained.

Figure 8:
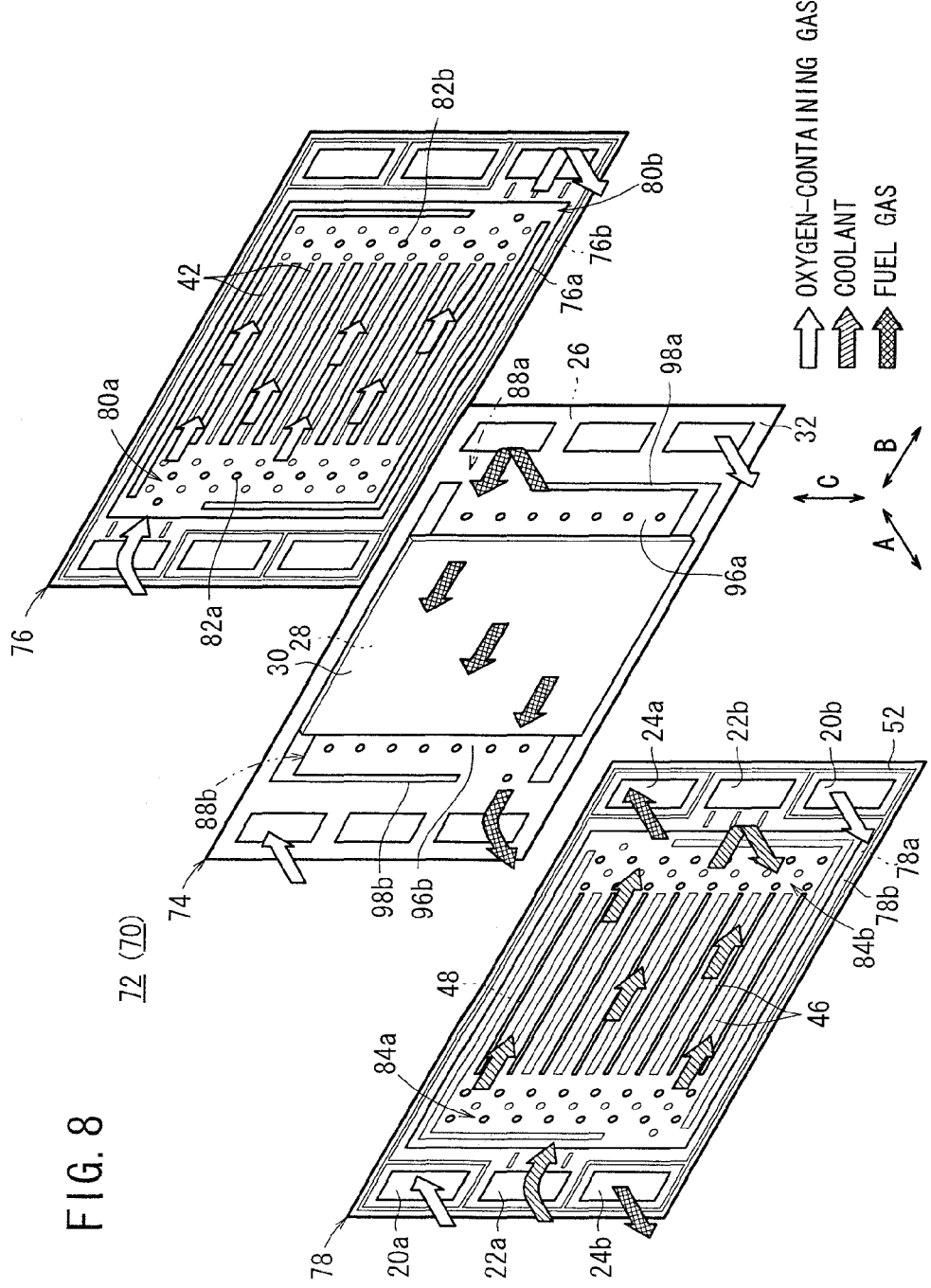
FIG. 8 is an exploded perspective view showing a fuel cell according to a fourth embodiment of the present invention.
Figure 9:
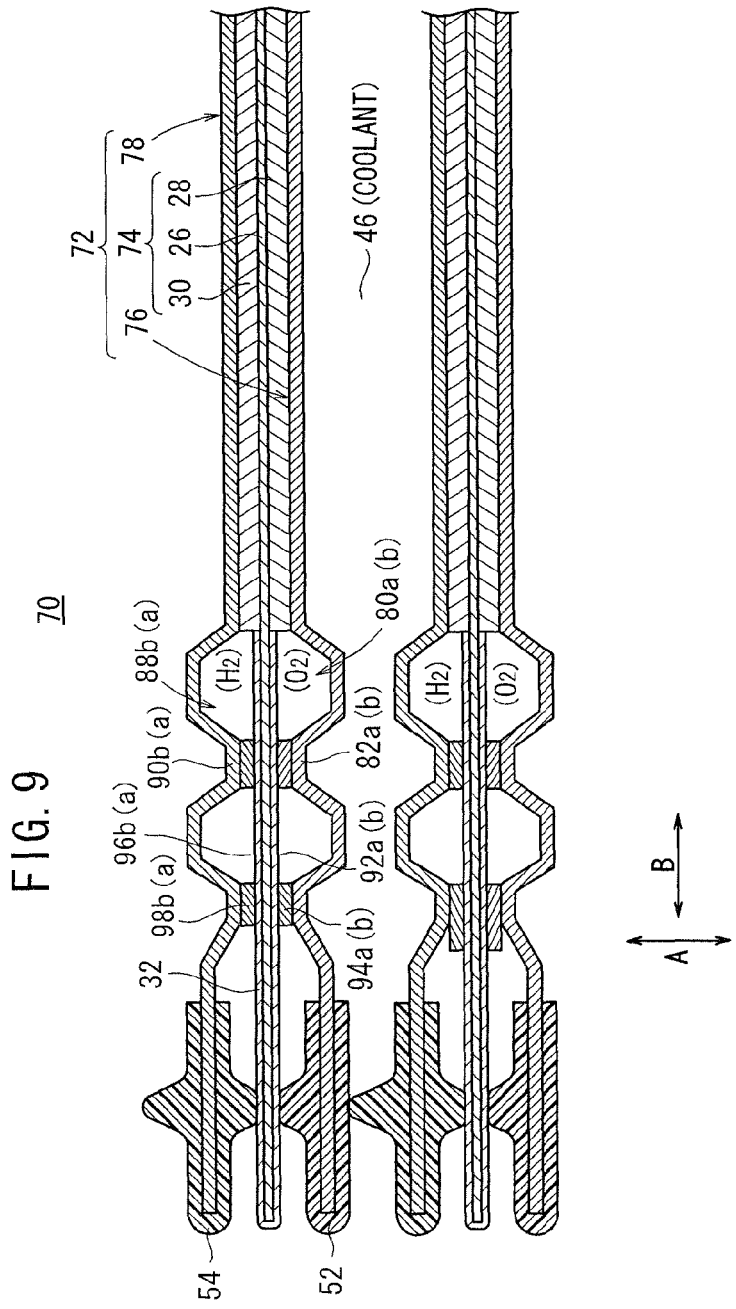
FIG. 9 is a cross sectional view showing the fuel cell formed by stacking a plurality of unit cells.

FIG. 8 is an exploded perspective view showing a fuel cell 70 according to a fourth embodiment of the present invention. FIG. 9 is a cross sectional view showing the fuel cell 70 formed by stacking a plurality of unit cells 72.

The unit cell 72 is formed by sandwiching a membrane electrode assembly 74 according to a third embodiment between a first metal separator 76 and a second metal separator 78. The first metal separator 76 has a plurality of oxygen-containing gas flow grooves 42 on its surface 76a facing the membrane electrode assembly 74. An oxygen-containing gas inlet buffer 80a and an oxygen-containing gas outlet buffer 80b are provided at both ends of the oxygen-containing gas flow grooves 42 in the direction indicated by the arrow B. A plurality of bosses 82a, 82b are formed in the oxygen-containing gas inlet buffer 80a and the oxygen-containing gas outlet buffer 80b, respectively.

Figure 10:
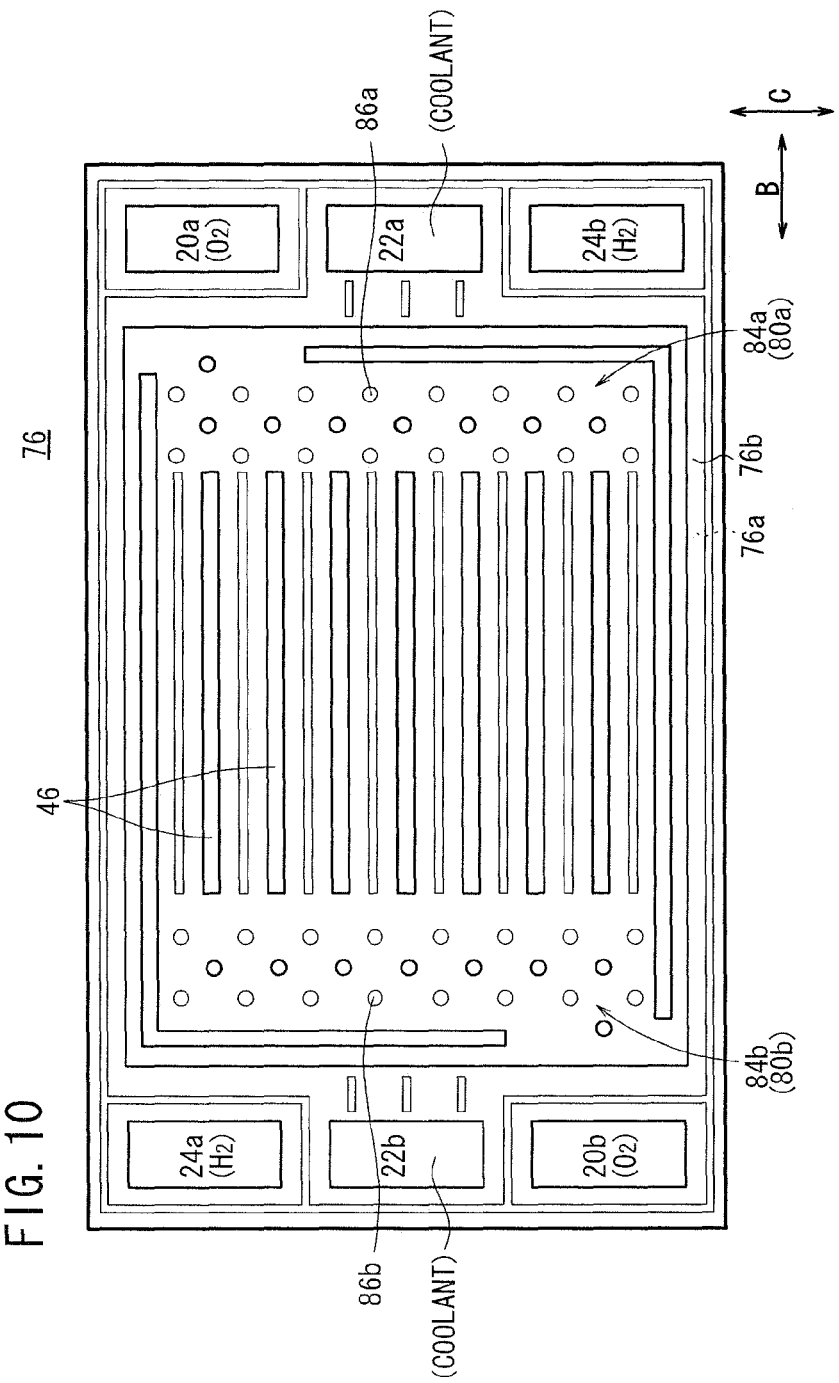
FIG. 10 is a front view showing a first metal separator of the unit cell.

As shown in FIG. 10, a plurality of coolant flow grooves 46 are formed on a surface 76b of the first metal separator 76. A coolant inlet buffer 84a formed by the back surface of the oxygen-containing gas inlet buffer 80a and a coolant outlet buffer 84b formed by the back surface of the oxygen-containing gas outlet buffer 80b are connected to both ends of the coolant flow grooves 46.

A plurality of bosses 86a, 86b are formed in the coolant inlet buffer 84a and the coolant outlet buffer 84b, respectively.

Figure 11:
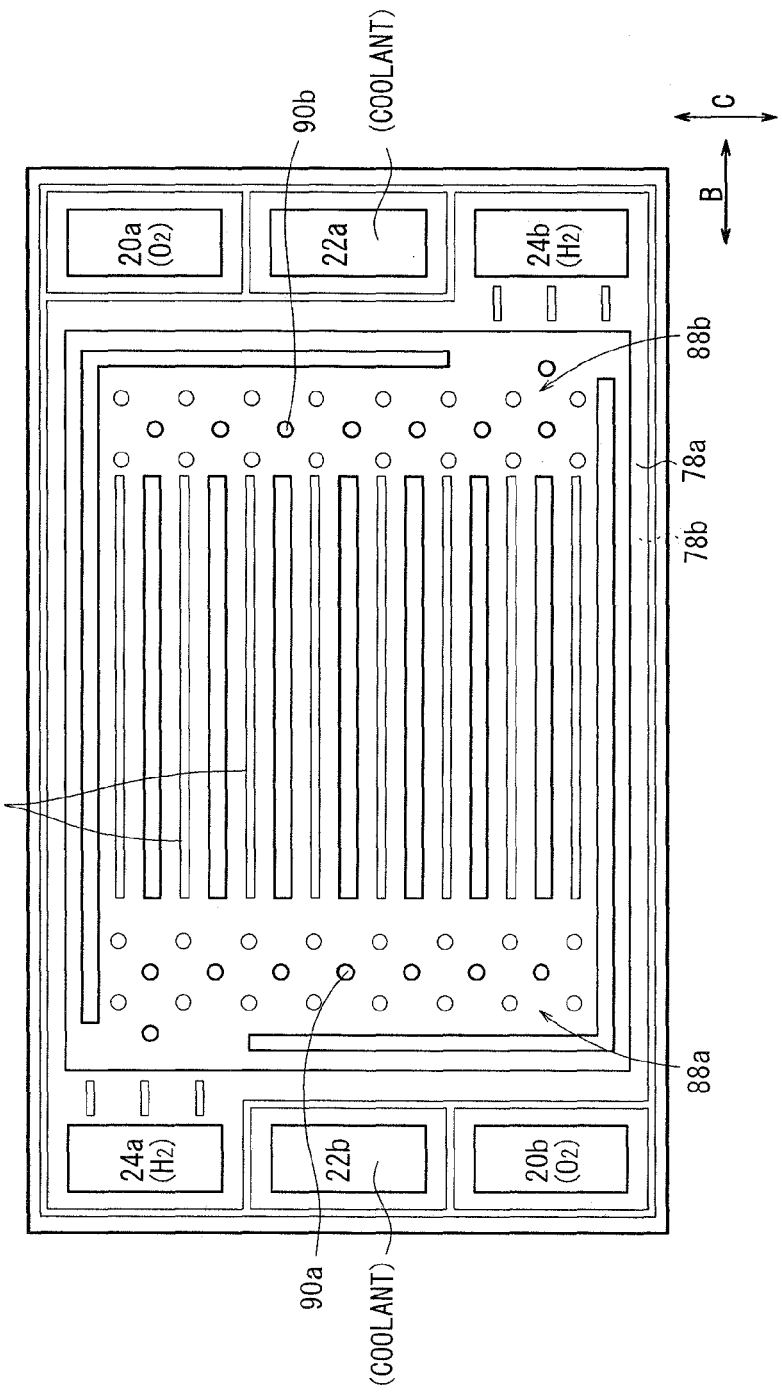
FIG. 11 is a front view showing a second metal separator of the unit cell.

As shown in FIG. 11, the second metal separator 78 has a plurality of fuel gas flow grooves 48 on its surface 78a facing the membrane electrode assembly 74. A fuel gas inlet buffer 88a and a fuel gas outlet buffer 88b are connected to both ends of the fuel gas flow grooves 48. A plurality of bosses 90a, 90b are formed in the fuel gas inlet buffer 88a and the fuel gas outlet buffer 88b, respectively.

As shown in FIG. 8, a plurality of coolant flow grooves 46 are formed on a surface 78b of the second metal separator 78. The coolant inlet buffer 84a and the coolant outlet buffer 84b are connected to both ends of the coolant flow grooves 46.

Figure 12:
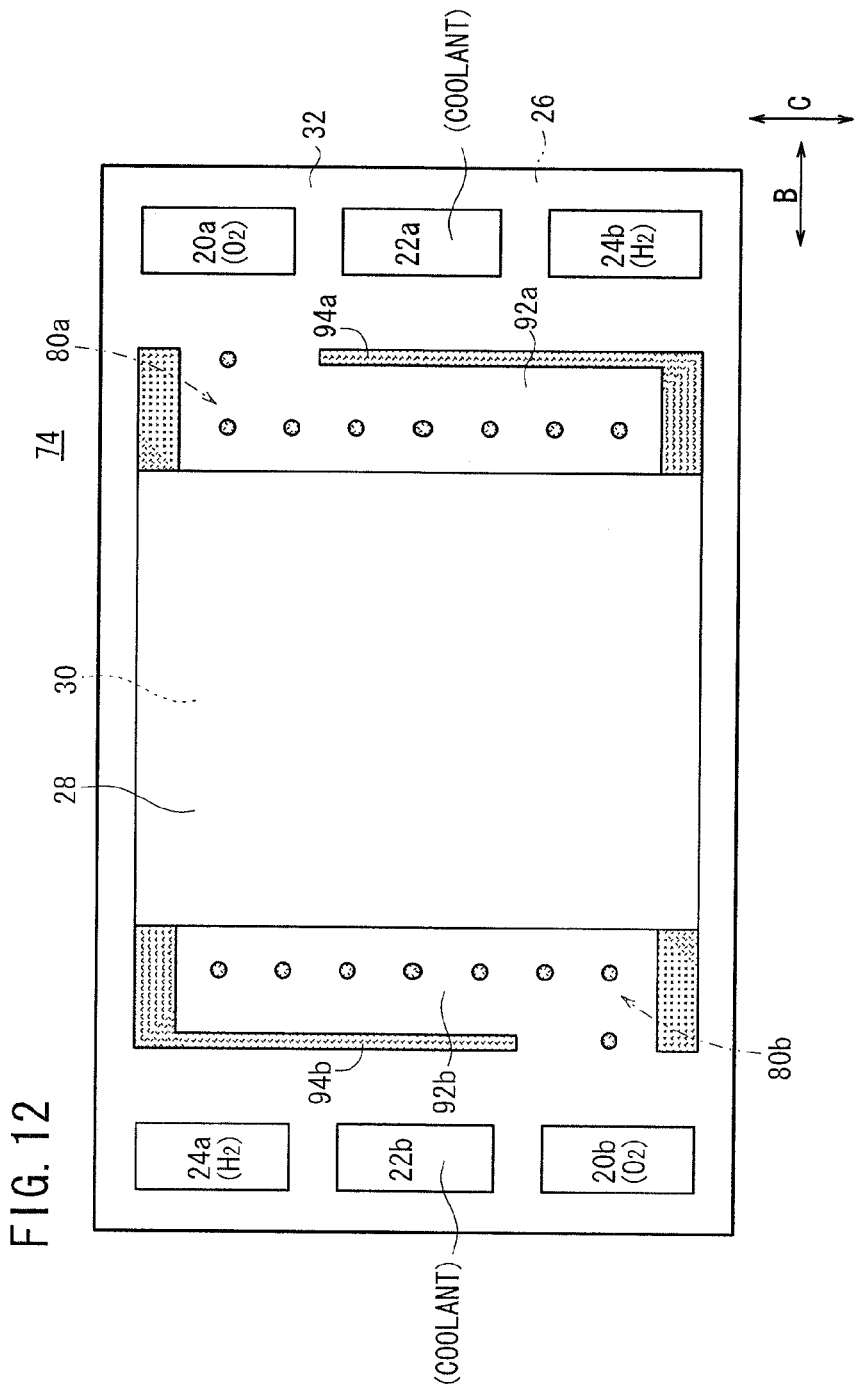
FIG. 12 is a front view showing an electrolyte electrode assembly of the unit cell.

As shown in FIGS. 9 and 12, in the membrane electrode assembly 74, a reinforcement member 32 is formed integrally with both surfaces of the outer end of the solid polymer electrolyte membrane 26. The oxygen-containing gas inlet channel 92a and the oxygen-containing gas outlet channel 92b are formed in the reinforcement member 32, outside the opposite ends of the cathode 28 in the direction indicated by the arrow B, at a position corresponding to the oxygen-containing gas inlet buffer 80a and a position corresponding to the oxygen-containing gas outlet buffer 80b, respectively.

The oxygen-containing gas inlet channel 92a is formed by a boss forming portion of a frame member 94a joined to (or formed integrally with) the reinforcement member 32, and the oxygen-containing gas outlet channel 92b is formed by a boss forming portion of a frame member 94b joined to (or formed integrally with) the reinforcement member 32.

As shown in FIG. 8, a fuel gas inlet channel 96a and a fuel gas outlet channel 96b are formed in the reinforcement member 32, outside the opposite ends of the anode 30 in the direction indicated by the arrow B, at positions corresponding to the fuel gas inlet buffer 88a and the fuel gas outlet buffer 88b, respectively.

The fuel gas inlet channel 96a is formed by a boss forming portion of a frame member 98a of the reinforcement member 32, and the fuel gas outlet channel 96b is formed by a boss forming portion of a frame member 98b of the reinforcement member 32.

In the fourth embodiment, for example, the fuel gas inlet buffer 88a and the fuel gas outlet buffer 88b connected to both ends of the fuel gas flow grooves 48 are formed by the bosses 90a, 90b in the second metal separator 78 and the fuel gas inlet channel 96a and the fuel gas outlet channel 96b in the reinforcement member 32 of the solid polymer electrolyte membrane 26.

Therefore, the fuel gas inlet buffer 88a and the fuel gas outlet buffer 88b can have the desired channel heights without requiring increase in the thickness of each unit cell 72 in the stacking direction. Thus, the same advantages as in the cases of the first and second embodiment are achieved. For example, the overall size of the fuel cell 70 is reduced, the pressure losses in the fuel gas inlet buffer 88a and the fuel gas outlet buffer 88b are lowered, and the product water is discharged smoothly.

Figure 13:
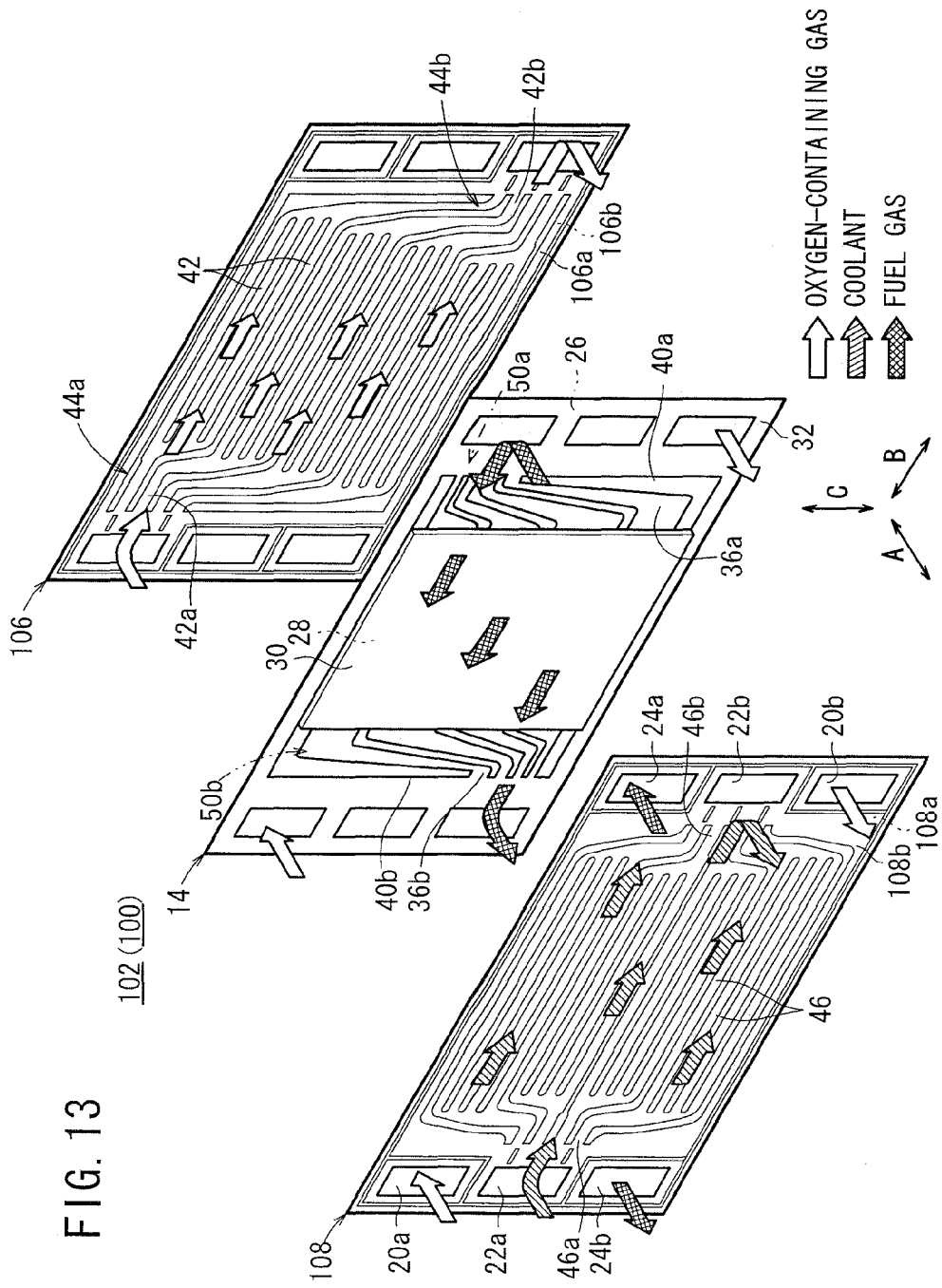
FIG. 13 is an exploded perspective view showing a fuel cell according to a fifth embodiment of the present invention.
Figure 14:
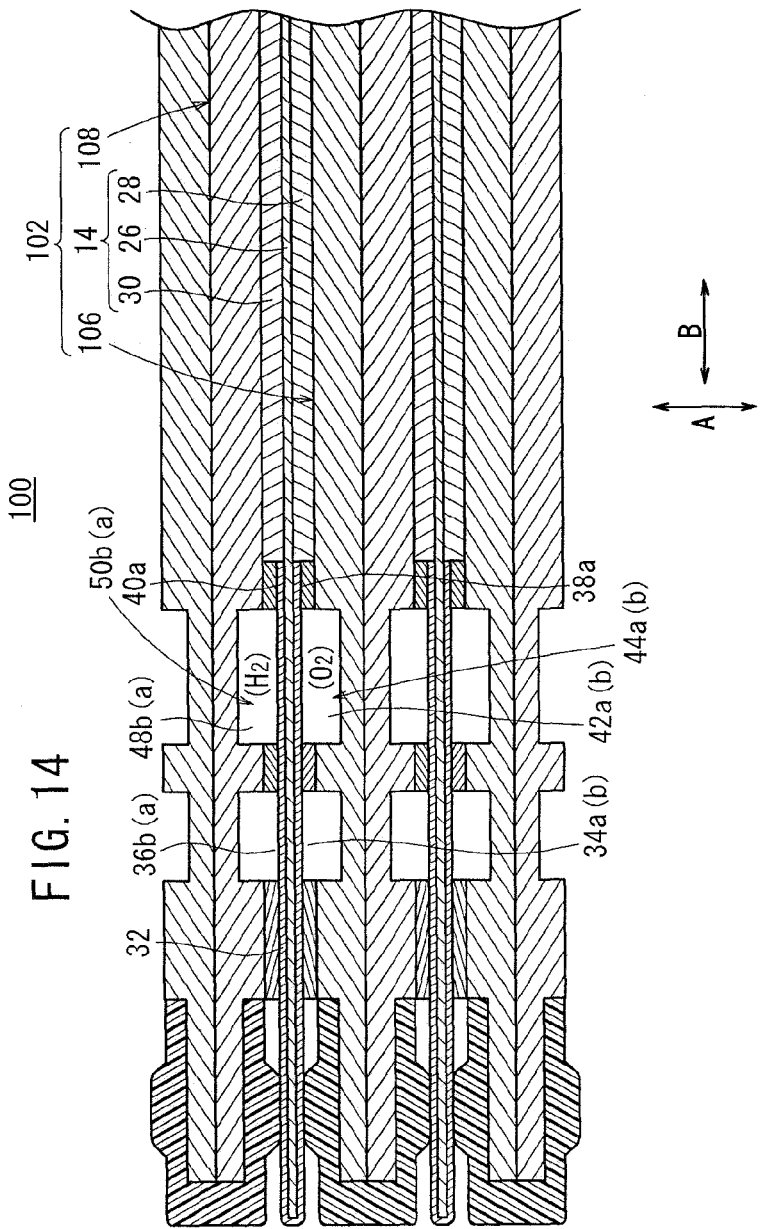
FIG. 14 is a cross sectional view showing the fuel cell formed by stacking a plurality of unit cells.

FIG. 13 is an exploded perspective view showing a fuel cell 100 according to a fifth embodiment of the present invention. FIG. 14 is a cross sectional view showing the fuel cell 100 formed by stacking a plurality of unit cells 102.

The unit cell 102 is formed by sandwiching a membrane electrode assembly 14 between a first carbon separator 106 and a second carbon separator 108. The first carbon separator 106 has a plurality of oxygen-containing gas flow grooves 42 on its surface 106a facing the membrane electrode assembly 14. An oxygen-containing gas inlet flow field 42a of the oxygen-containing gas inlet buffer 44a and an oxygen-containing gas outlet flow field 42b of the oxygen-containing gas outlet buffer 44b are connected to both ends of the oxygen-containing gas flow grooves 42 in the direction indicated by the arrow B.

Figure 15:
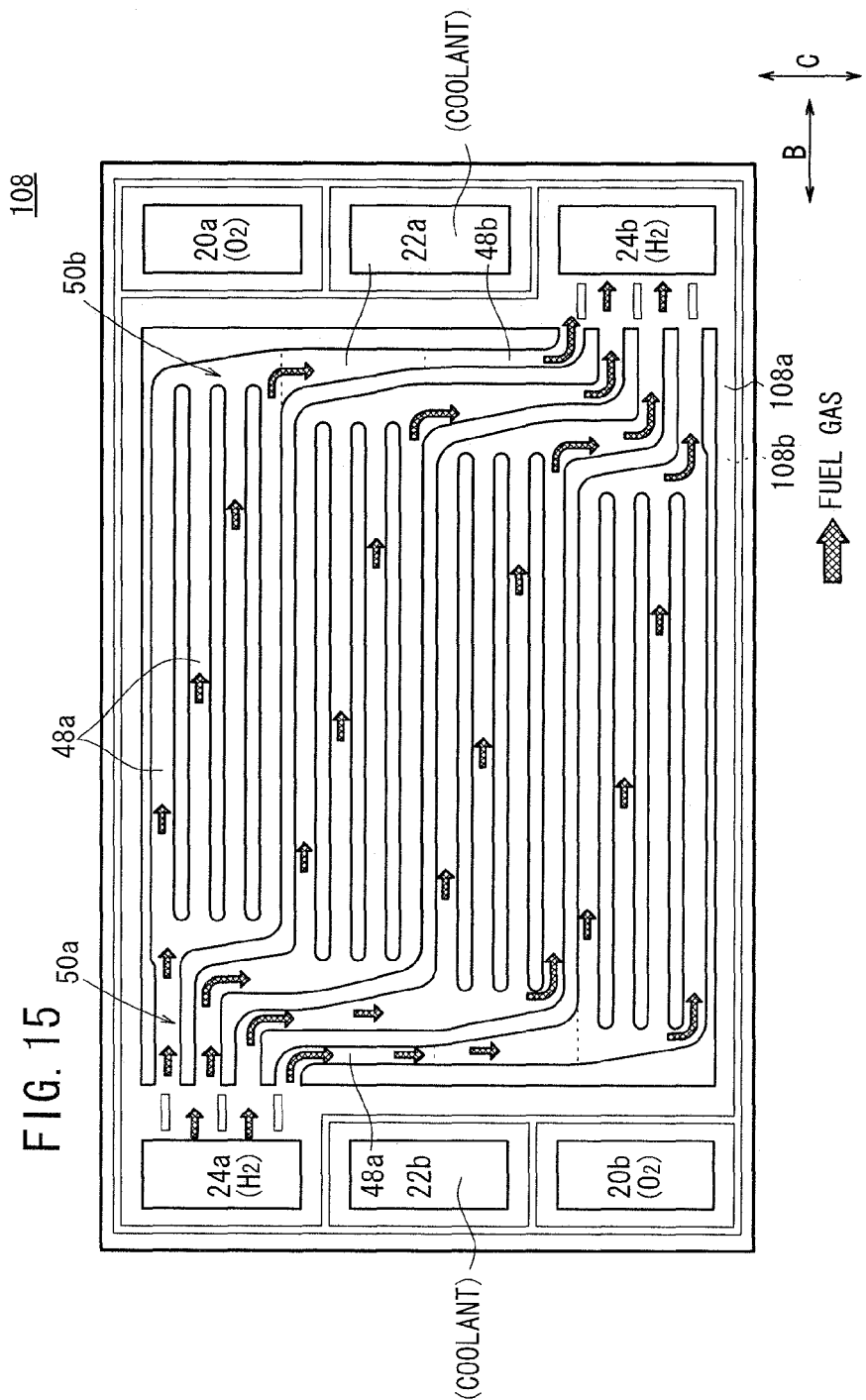
FIG. 15 is a front view showing a second carbon separator of the unit cell.
Figure 16:
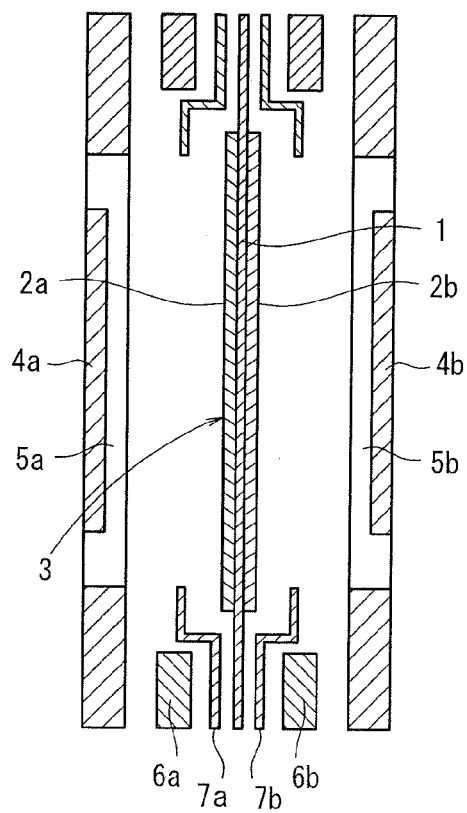
FIG. 16 is a solid polymer electrolyte fuel cell disclosed in Japanese Laid-Open Patent Publication No. 05-242897.

For example, the first carbon separator 106 has a flat surface 106b. As shown in FIG. 15, the second carbon separator 108 has a plurality of fuel gas flow grooves 48 on its surface 108a facing the membrane electrode assembly 14. A fuel gas inlet flow field 48a of the fuel gas inlet buffer 50a and a fuel gas outlet flow field 48b of the fuel gas outlet buffer 50b are connected to both ends of fuel gas flow grooves 48.

As shown in FIG. 13, a plurality of coolant flow grooves 46 are formed on a surface 108b of the second carbon separator 108. A coolant inlet flow field 46a and a coolant outlet flow field 46b are connected to both ends of the coolant flow grooves 46. The coolant inlet flow field 46a is connected to the coolant supply passage 22a, and the coolant outlet flow field 46b is connected to the coolant discharge passage 22b.

In the fifth embodiment, the first carbon separator 106 and the second carbon separator 108 are used instead of the metal separators, and the membrane electrode assembly 14 is adopted. Therefore, the same advantages as in the case of the first embodiment are obtained. For example, the overall size of the fuel cell 100 is reduced, and the oxygen-containing gas and the fuel gas are distributed uniformly to the cathode 28 and the anode 30, respectively. Further, the optimum shapes can be designed in the reactant gas surfaces and the coolant surfaces individually.

Though the membrane electrode assembly 14 is used in the fifth embodiment, alternatively, any of the membrane electrode assemblies 64, 64a, and 74 may be used.

While the invention has been particularly shown and described with reference to preferred embodiments, it will be understood that variations and modifications can be effected thereto by those skilled in the art without departing from the scope of the invention as defined by the appended claims.

What is claimed is:

1. An electrolyte electrode assembly for a fuel cell, the electrolyte electrode assembly comprising:
   a pair of electrodes and an electrolyte interposed between the electrodes, a surface area of the electrolyte being larger than surface areas of the electrodes; and
   a frame reinforcement member provided at least on one surface of an outer end of the electrolyte protruding outwardly from the electrodes,
   wherein the frame reinforcement member has a reactant gas channel for flowing a fuel gas or an oxygen-containing gas as a reactant gas, a groove of the reactant gas channel being provided on a surface of the frame reinforcement member opposite to the electrolyte.

2. An electrolyte electrode assembly according to claim 1, wherein the reactant gas channel is formed by joining a frame member having a channel shape to the frame reinforcement member.

3. An electrolyte electrode assembly according to claim 1, wherein the reactant gas channel is formed in the frame reinforcement member itself.

4. A fuel cell formed by sandwiching an electrolyte electrode assembly between a pair of separators, the electrolyte electrode assembly comprising:
   a pair of electrodes and an electrolyte interposed between the electrodes, a surface area of the electrolyte being larger than surface areas of the electrodes; and
   a frame reinforcement member provided at least on one surface of an outer end of the electrolyte protruding outwardly from the electrodes,
   wherein a reactant gas flow field for supplying a fuel gas or an oxygen-containing gas as a reactant gas along one of the electrodes and a buffer for allowing at least the reactant gas to flow between the outside of the one of the electrodes and the reactant flow field are provided between the electrolyte electrode assembly and one of the separators; and the frame reinforcement member has a reactant gas channel for flowing the reactant gas, at a position corresponding to the buffer, a groove of the reactant gas channel being provided on a surface of the frame reinforcement member opposite to the electrolyte.

5. A fuel cell according to claim 4, wherein the reactant gas channel is formed by overlapping a frame member having a channel shape on the frame reinforcement member.

6. A fuel cell according to claim 4, wherein the reactant gas channel is formed in the frame reinforcement member itself.

7. A fuel cell according to claim 4, wherein the reactant gas flow field facing the reactant gas channel is formed in the one of the separators at a position corresponding to the buffer.

8. A fuel cell according to claim 7, wherein the reactant gas flow field and the reactant gas channel of the buffer have the same shape.

* * * * *

UNITED STATES PATENT AND TRADEMARK OFFICE
CERTIFICATE OF CORRECTION

| | | |
|---|---|---|
| PATENT NO. | : 8,524,416 B2 | Page 1 of 1 |
| APPLICATION NO. | : 12/469342 | |
| DATED | : September 3, 2013 | |
| INVENTOR(S) | : Kentaro Ishida et al. | |

It is certified that error appears in the above-identified patent and that said Letters Patent is hereby corrected as shown below:

In the Claims:

At column 10, claim number 1, line number 9, delete "has a" and insert -- forms with an opposing separator an inlet or outlet --.

At column 10, claim number 1, line number 11, delete "a groove of the" and insert -- the inlet or outlet --.

At column 10, claim number 1, line number 13, delete "." and insert -- , the inclusion of the frame reinforcement member in forming the inlet or outlet reactant gas channel increasing an area of the inlet or outlet reactant gas channel, the inlet or outlet reactant gas channel forming part of an inlet or outlet buffer. --.

At column 11, claim number 4, line number 4, delete "has" and insert -- forming --.

At column 11, claim number 4, line number 5, delete "at a position corresponding to the buffer, a groove of".

At column 11, claim number 4, line number 8, insert at the end of the sentence -- and forming part of the buffer, the frame reinforcement member increasing an area of the reactant gas channel. --.

Signed and Sealed this
Sixth Day of May, 2014

Michelle K. Lee
*Deputy Director of the United States Patent and Trademark Office*